United States Patent [19]

Stout

[11] 4,244,355
[45] Jan. 13, 1981

[54] MODULAR STRUCTURALLY INTEGRATED SOLAR PANEL

[76] Inventor: Jack Stout, 1209 Kouba Dr., Yukon, Okla. 73099

[21] Appl. No.: 912,413

[22] Filed: Jun. 5, 1978

[51] Int. Cl.³ ............................................... F24J 3/02
[52] U.S. Cl. ................... 126/450; 126/447; 126/417; 165/48 S
[58] Field of Search ............... 126/270, 271, 450, 446, 126/447, 417; 237/1 A; 165/170, 485; 52/199, 11, 15

[56] References Cited

U.S. PATENT DOCUMENTS

| | | | |
|---|---|---|---|
| 3,230,859 | 1/1966 | O'Hea et al. | 98/42 |
| 3,980,071 | 9/1976 | Barber, Jr. | 126/271 |
| 3,987,784 | 10/1976 | Godrick | 126/270 X |
| 4,065,883 | 1/1978 | Thibodeau | 52/11 |
| 4,120,288 | 10/1978 | Barrett | 126/271 |
| 4,129,117 | 2/1978 | Harvey | 126/448 |
| 4,144,874 | 3/1979 | Zebuhr | 126/450 |

Primary Examiner—James C. Yeung
Assistant Examiner—Larry Jones
Attorney, Agent, or Firm—Laney, Dougherty, Hessin & Beavers

[57] ABSTRACT

An improved solar panel system is provided which is constructed for mounting of solar collector panel modules between conventionally spaced and sloped roof rafters. The solar panel modules include integral gutter portions and integral flashing portions. The solar panel system also includes a system of top and side flashings which complement the integral flashings of the solar panel modules so as to provide a solar panel system integrable with a conventional roof shingle system to provide leak-proof mounting of the solar panel system within the conventional shingle roof structure.

2 Claims, 10 Drawing Figures

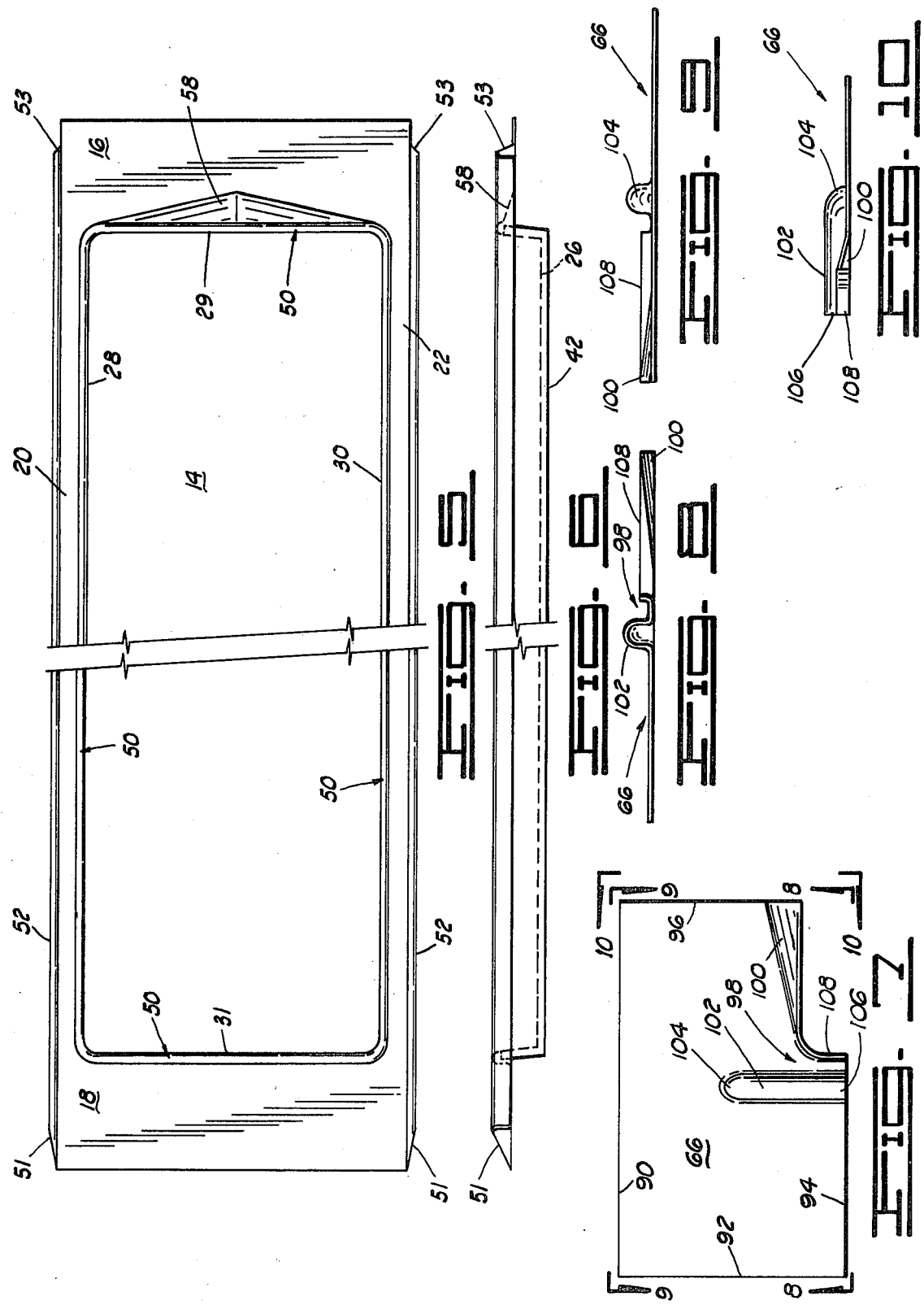

MODULAR STRUCTURALLY INTEGRATED SOLAR PANEL

BACKGROUND OF THE INVENTION

1. Field of the Invention

This invention relates generally to solar panels for collecting solar energy, and more particularly, but not by way of limitation, to modular structurally integrated solar panel systems including a combination of integral gutters and flashing members so that the solar panel system may be mounted in a leak-proof manner within a conventional shingled roof structure.

2. Description of the Prior Art (Prior Art Statement)

The following statement is intended to be a prior art statement in compliance with the guidance and requirements of 37 CFR §§1.56, 1.97 and 1.98 and with §609 of the Manual of Patent Examining Procedure.

The most relevant prior art reference known to Applicant is U.S. Pat. No. 3,980,071 to Barber, Jr. FIG. 4 of the Barber patent depicts a solar energy collector mounted between joists or rafters 11. Flashing portions 30 and 38 are there shown for leak-proof mounting of the solar collector upon the joists. The Barber patent does not show or suggest the integration of its solar panels with a conventional shingled roof structure.

Another reference of interest is U.S. Pat. No. 4,010,733 to Moore. The Moore patent shows a solar collector having integral channel members 23 constructed thereon. The channel members 23 of the Moore patent function as substitutes for conventional roof rafters.

U.S. Pat. No. 4,029,080 to Warren and No. 3,987,784 to Godrick show other variations of solar panels constructed for installation between roofing rafters and the like.

The following U.S. Patents are also of general interest concerning various aspects of solar panel construction similar to certain aspects seen in the solar panel of the present invention:

| U.S. Pat. No. | Name |
|---|---|
| 1,742,861 | Johnson |
| 2,625,930 | Harris |
| 3,897,820 | Teeter, Jr. |
| 4,000,850 | Diggs |
| 4,011,856 | Gallagher |
| 4,023,556 | Sarazin et al. |
| 4,020,605 | Zenos |
| 4,027,652 | Collura |
| 4,043,317 | Scharfman |
| 4,060,071 | Chayet |

It is seen from these prior art references that most available solar collectors are constructed to be of such a size and configuration as to prevent integral mounting of those solar collectors within a conventional shingle roof system. Most available solar collectors are built in approximately three foot by seven foot sizes, presumably because suitable glass of this size is readily available from sliding glass door component suppliers and the like. This non-modular factor, and the unattractive boxlike construction of the available collectors, compounded by the prevailing opinion, among those skilled in the art, that collectors should be mounted at the site latitude plus 10° slope, has resulted in unsightly paraphernalia perched at precarious angles on roof tops in most solar application.

Many attempts at the creation of roofing structure to accommodate the integral mounting of these prior art collectors have often created structures totally inharmonious with surrounding architecture. In those applications where the collectors have been mounted on top of the roof structure, the proximity of the collectors to the roof have often created rotting and fungi propagation on the roof adjacent the collector, and the penetrations required through the roof structure for plumbing to be connected to the collectors has caused numerous problems with leakage, which are further accentuated by the rotting and fungus problems. Also, many of these prior art collectors are connected together in such a manner that when a plurality of collectors have been installed, it is not possible to remove any one given collector without often having to remove adjacent collectors.

The modular integrally mounted solar panel system of the present invention, however, materially reduces or eliminates all of the above-mentioned objections. The solar panel system of the present invention includes flashing members integrated with the conventional shingles of a conventional shingled roof structure and includes integrally constructed gutters so as to provide means by which rainfall is carried across the solar panel system without permitting leakage of the water through the roof. Since the solar panel system is integrally mounted with the roof, there are no plumbing connections which must be made through the roof. Since the undersides of the solar collector modules are located within the aerated attic portion of the building, problems with mildew and fungus are also eliminated.

SUMMARY OF THE INVENTION

An improved solar panel system is provided which is constructed for mounting of solar collector panel modules between conventionally spaced and sloped roof rafters. The solar panel modules include integral gutter portions and integral flashing portions. The solar panel system also includes a system of top and side flashings which complement the integral flashings of the solar panel modules so as to provide a solar panel system integrable with a conventional roof shingle system to provide leak-proof mounting of the solar panel system within the conventional shingle roof structure.

It is therefore a general object of the present invention to provide a modular structurally integrated solar panel system.

A further object of the present invention is the provision of a solar panel system constructed for mounting within a conventional shingled roof system in a leak-proof manner.

Another object of the present invention is to provide a solar panel module having integrally constructed gutters.

Yet another object of the present invention is the provision of a complementary flashing system for use with modular solar panels mounted upon conventional roof rafters to integrate said solar panels with a conventional shingle system located upon said roofing rafters.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 5 is a plan view of one of the solar panel modules.

FIG. 6 is a longitudinal elevation view of one of the solar panel modules.

FIG. 7 is a plan view of the left upper complementary flashing.

FIG. 8 is a view of the flashing of FIG. 7, along the lines 8—8.

FIG. 9 is a view of the flashing of FIG. 7, along the lines 9—9.

FIG. 10 is a view of the flashing of FIG. 7, along the lines 10—10.

DETAILED DESCRIPTION OF THE PREFERRED EMBODIMENTS OF THE INVENTION

Figure 1:
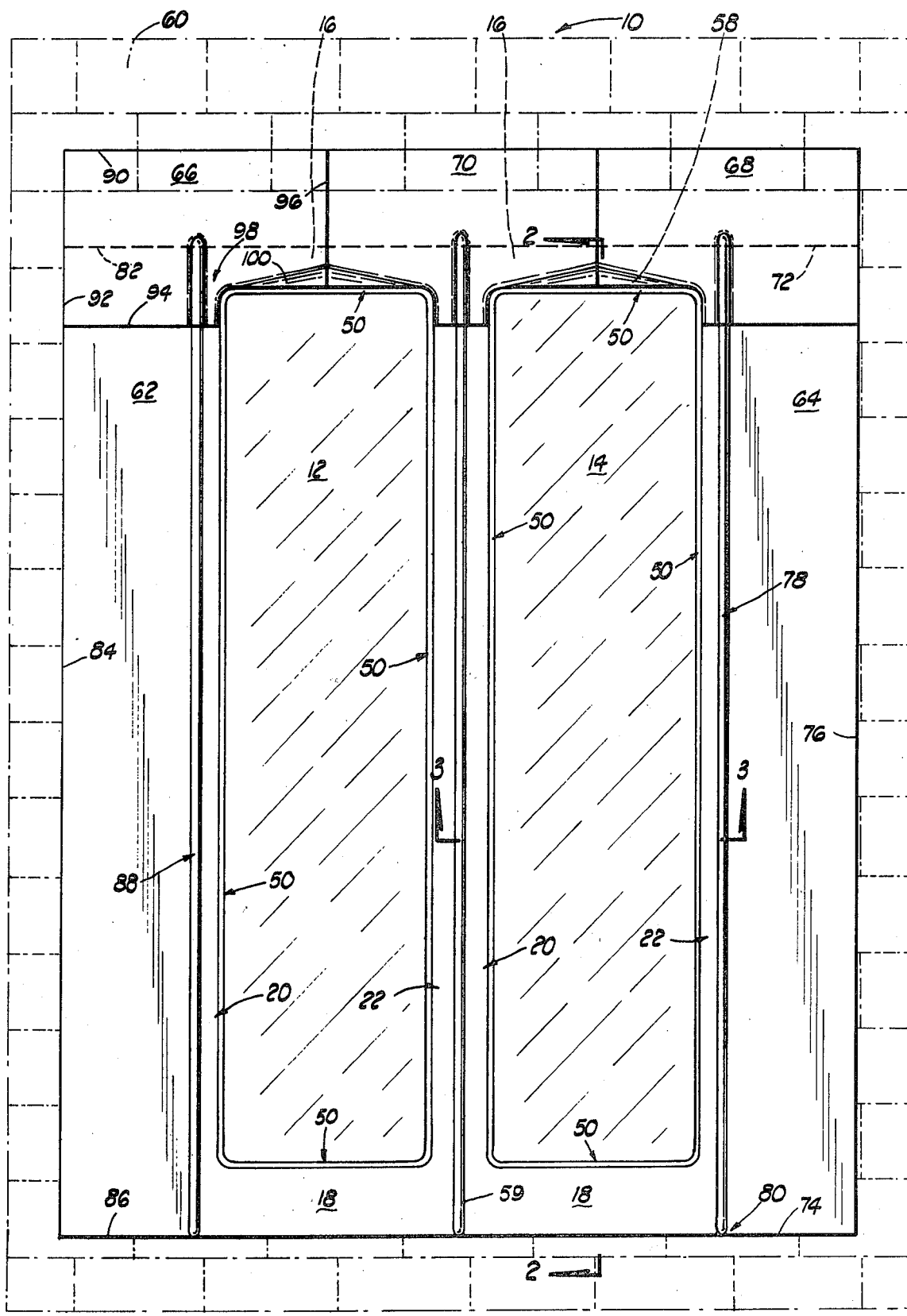
FIG. 1 is a plan view of the modular structurally integrated solar panel system of the present invention.
Figure 2:
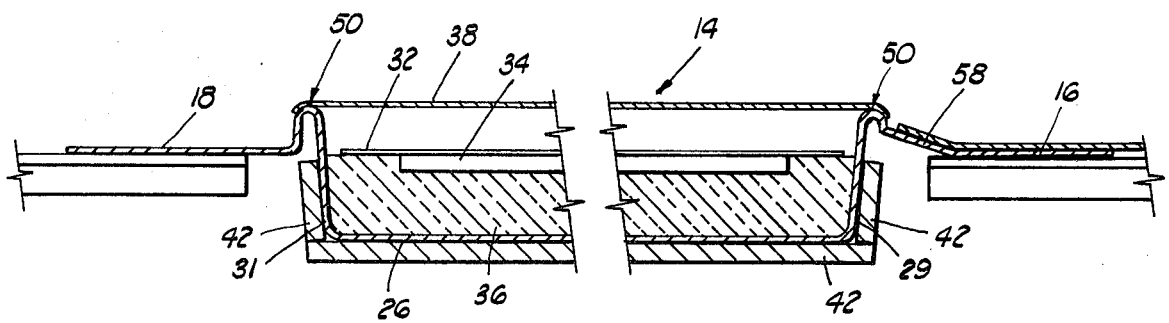
FIG. 2 is a sectional view taken along lines 2—2 of FIG. 1, showing a longitudinal cross-section of one of the solar panel modules.

Referring now to the drawings and particularly to FIG. 1, the solar panel system of the present invention is shown and generally designated by the numeral 10.

The solar panel system 10 includes first and second solar panel modules 12 and 14. Each of said solar panel modules includes integral upper and lower flashing portions 16 and 18, respectively. Each solar panel module also includes integrally constructed gutter portions 20 and 22, located on either side of a collector housing 24, as is best seen in FIG. 3.

Figure 3:
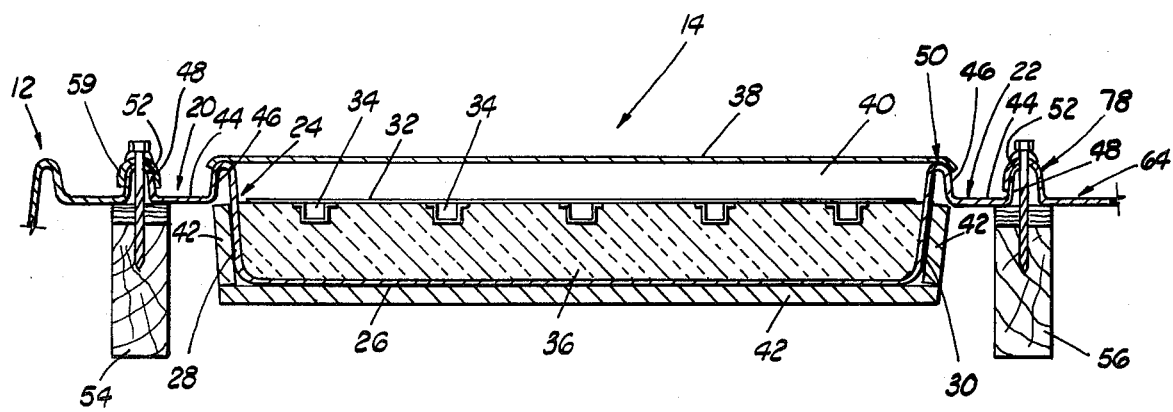
FIG. 3 is a sectional view along lines 3—3 of FIG. 1 showing a transverse cross-sectional view of one of the solar panel modules of FIG. 1.

With further reference to FIG. 3, the details of construction of the solar panel module 14 are shown. Solar panel module 12 is of similar construction.

The solar panel module 14 includes the housing 24 which has a flat bottom portion 26, substantially vertical upper and lower end walls 29 and 31, and side walls 28 and 30, which are integrally connected to the gutter portions 20 and 22, respectively. The housing 24, along with the integral gutters and flashings, are preferably constructed of high temperature fiberglass reinforced plastic, die stamped steel or aluminum.

Within the collector housing 24 there is located a collector plate 32 having a plurality of tubes 34 attached to the bottom side thereof for carrying the liquid to be heated by the solar collector. Collector plate 32 is preferably constructed of copper with an absorptive coating. The absorptive coating must be able to withstand maximum temperatures on the order of 500° F., and is preferably made from ceramic enamel or black chrome over nickel.

Between the bottom surface of the solar collector plate 32 and the bottom portion 26 of the collector housing 24, there is located a thickness of insulation material 36.

A fiberglass reinforced plastic translucent cover 38 covers the top portion of the collector housing 24. Between the cover 38 and the collector plate 32 there is a dead air space 40.

The outer surfaces of the bottom 26 and the side walls of the collector housing 24 have attached thereto a layer of external insulating material 42, which is preferably constructed of a one-half inch thick layer of sheetrock. The external insulating layer 42 also enhances the fire resistancy of the collector unit.

The gutter portions 20 and 22 each have a bottom surface 44 and inner and outer side walls 46 and 48.

The inner side walls 46 are integrally constructed with one of the side walls 28 and 30 of collector housing 24 so as to form a substantially vertical extending ridge 50 which is spanned by the cover 38 and sealingly covered thereby. The substantially vertically extending ridge 50 also extends across the top and bottom ends of the solar collector 14 so that the ridge 50 defines the substantially rectangular outer perimeter of the collector housing 24.

Each of the outer side walls 48 of the gutters 20 and 22 includes a curved upper lip portion 52 which extends to a point just short of a vertical center line of one of the conventionally spaced and sloped parallel roof rafters 54 and 56, between which the solar panel module 14 is mounted. As is best seen in FIGS. 5 and 6, the lip portions 52 are trimmed at their ends 51 and 53 so as to fit under the inverted sealing channel members, described in more detail below.

The roof rafters 54 and 56 are conventionally spaced on 24 inch centers. The dimension of the solar panel module 14 between the outer edges of the lip portions 52 is preferably 23¾ inches so that when said solar panel module 14 is placed between said rafters 54 and 56, each of said lip portions 52 extends to a point just short of a vertical center line of one of said roof rafters.

At the upper end of the collector module 14, there extends from the vertical ridge 50 a sloped ramp portion 58 which integrally connects the ridge 50 with the upper flashing 16 of the module 14, and which extends between the side gutters 20 and 22. The ramp portion 58 is a V-shaped ramp portion, as is best seen in FIG. 5. The ramp portion 58 serves to divert rainwater and the like into the side gutters 20 and 22 and away from the collector housing 24.

At the lower end of the collector module 14 the ridge 50 is integrally connected with the lower flashing 18 of the module 14.

As is shown in FIGS. 1 and 3, the space between adjacent lip portions 52 of solar panel modules 12 and 14 is sealed by a separate inverted sealing channel 59, the lower end of which is rounded and closed.

Referring again to FIG. 1, a complementary flashing system is shown which serves to integrate the integral flashings of the solar collector modules 12 and 14 with conventional shingles 60 (shown in phantom lines) of a conventional shingled roof structure.

The complementary flashing system includes first and second complementary side flashings 62 and 64, respectively. Also included are left and right upper complementary flashings, 66 and 68, and central upper complementary flashing 70.

The left and right complementary side flashings 62 and 64 are constructed as follows. Referring to the right complementary side flashing 64, the side flashing 64 is rectangular in shape, having an upper edge 72, a lower edge 74, and an outer edge 76. The inner edge of the flashing 64 comprises an integral inverted sealing channel 78 which is best seen in the cross-sectional view of FIG. 3. The lower end 80 of the sealing channel 78 is rounded and closed. The inverted sealing channel 78 sealingly engages the lip portion 52 of the outer side wall of the gutter 22 of solar panel module 14.

The left complementary side flashing 62 is of similar, but symmetrically opposite, construction to the right side flashing just described. The left side flashing is defined by an upper edge 82, outer edge 84, lower edge 86 and an integral inverted sealing channel member 88. The inverted sealing channel 88 sealingly engages the lip portion 52 of the outer side wall of the gutter 20 of solar panel module 12.

The details of construction of the left upper complementary flashing 66 are best shown in FIGS. 7, 8, 9 and 10. The right upper complementary flashing 68 is of similar, but symmetrically opposite construction.

The left upper, or first outer upper, complementary flashing 66 has upper edge 90, outer edge 92, lower edge 94 and inner edge 96. Between the lower edge 94 and the inner edge 96 is gutter junction portion 98 and flap portion 100, partially coextensive with the ramp portion 58 of the solar panel module 12. The left upper complementary flashing 66 provides means for sealingly engaging the integral upper flashing portion 16 of the solar panel module 12, and for sealingly engaging the left complementary side flashing 62. The flat outer portion of the flashing 68 provides a means for integrating the solar panel system 10 with the shingles 60 of a conventional roof shingle system.

FIG. 8 shows a lower end view of the left upper complementary flashing 66. Flashing 66 has an integral inverted sealing channel member 102 having an upper closed and rounded end 104 and a lower open end 106. The inverted sealing channel member 102 fits over the similar inverted sealing channel member 88 of the left complementary side flashing 62, as is seen in FIG. 1. The gutter junction portion 98 of the left upper complementary flashing 66 is formed between the inner side of the inverted U-shaped channel member 102 and a vertically extending lip 108. The vertical lip 108 fits adjacent the perimeter of the vertically extending ridge 50 of the first solar panel module 12.

The right upper, or second upper outer, complementary flashing 68 is of similar, but symmetrically opposite, construction.

The right side of the center upper complementary flashing 70 is similar to that portion of the left upper complementary flashing 66 to the right of the center line of the inverted sealing channel member 102. The left side of the center upper complementary flashing 70 is the mirror image of the right side about that same center line.

Figure 4:
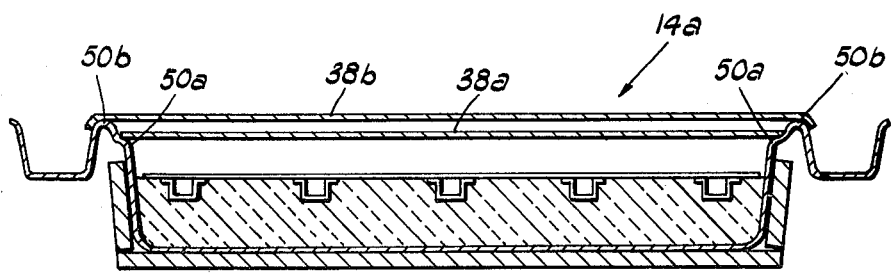
FIG. 4 is a view similar to FIG. 3 showing a transverse cross-sectional view of an alternative embodiment of the solar panel modules.

FIG. 4 shows an alternative design for the cross-section of a solar panel module 14a. The construction is similar to that shown in FIG. 3, except for the shape of the vertical ridge and the addition of a second translucent cover. A compound ridge is provided having an inner ridge 50a and an outer ridge 50b. An inner cover 38a spans, and sealingly engages, the inner ridge 50a. An outer cover 38b spans and sealingly engages the outer ridge 50b. This alternative, double lens, design may be desirable in very cold climates to minimize heat loss from the solar panel module to the outside air.

INSTALLATION AND OPERATION

A primary advantage of the solar panel system 10 is the economic benefit achieved upon installation due to the fact that the solar panel modules may be mounted upon a conventionally sloped roof and integrated with a conventional roof shingle system by means of the complementary flashings. The integral gutters are provided to insure that heavy rainfall will flow across the solar panel system 10 without entering the collector housings 24.

As mentioned above, this approach is considerably different from the more conventional solar panel installations which are typically mounted at radical angles as compared to a standard roofline.

The solar panel system 10 is designed for installation at the roof pitches normally used in more traditional buildings, so as to conform as nearly as possible with locally acceptable architectural standards. There are offsetting advantages and disadvantages of the proposed system, which make it an attractive alternative to those persons wishing to have solar heating while retaining the traditional appearance of their home.

For example, a 1.47° (4/12 pitch) installation in Oklahoma City, Ok. (35° latitude) results in approximately a 21% decrease in performance in January and a 25% increase in performance in August, as compared to a 45° (12/12 pitch) installation as is most often used in that locale. The cost of the additional panels necessary for winter heating is, however, offset by the lower cost of the less steeply pitched roofs and the decreased cost of installation of the panels. The excess heat available in the summer may be used to heat swimming pools, saunas and the like. Also, it is envisioned that the near future will see the development of an absorption type air conditioner which can effectively use the relatively low temperature heat available from flat plate solar collectors. When this occurs, the demand for this type of collector will be enormous.

The solar panel system 10 will be installed by the roofing contractors, or by the heating and plumbing contractor, at the same time the roof decking or shingles are installed. Installation time and labor will be the same as, or less than, installing a standard roof. No roof penetrations will be required as all plumbing will be in the attic space. No moisture or fungus will collect as the bottom of the insulated panel is in the ventilated attic. The modular placement will facilitate construction of modular plumbing manifolds to further reduce the installation cost.

Thus, the modular structurally integrated solar panel system of the present invention is well adapted to carry out the objects and attain the ends and advantages mentioned, as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A solar panel system for the mounting of solar panel modules between conventionally spaced and sloped roof rafters, and for integration of said modules with a conventional roof shingle system for leakproof mounting of said modules, comprising:
   first and second solar panel modules, each of said modules having a collector housing with a substantially vertical ridge extending around the periphery thereof, and each module having integral side gutter portions and integral upper and lower flashing portions;
   a first complementary side flashing having an inverted sealing channel for engagement with an outer wall of one of said side gutters of said first solar panel module;

a second complementary side flashing having an inverted sealing channel for engagement with an outer wall of one of said side gutters of said second solar panel module;

a separate inverted sealing channel for engagement with an outer side wall of adjacent gutter portions of each of said solar panel modules;

a first upper outer complementary flashing, for sealing engagement with said first complementary side flashing and said integral upper flashing of said first module;

a second upper outer complementary flashing, for sealing engagement with said second complementary side flashing and said integral upper flashing of said second module; and a central upper complementary flashing for sealing engagement with said integral upper flashings of said first and second modules.

2. The solar panel system of claim 1 wherein:

each of said panel modules includes a sloped ramp portion extending from the upper end of said collector housing and extending between said gutter portions so that water running across said solar panel system will be diverted into said gutter portions and away from said collector housing; and each of said central and first and second outer upper complementary flashings includes:

flap means, partially coextensive with one of said sloped ramp portions;

an integral inverted sealing channel, closed and rounded on its upper end and open at its lower end for sealing engagement with another of said inverted sealing channels; and a gutter junction portion, between said inverted sealing channel of said upper complementary flashing and said flap means, for diverting water across said upper complementary flashing into a gutter portion of one of said modules.

* * * * *